United States Patent

Suzuki

[15] 3,638,549
[45] Feb. 1, 1972

[54] PHOTOGRAPHING SYSTEM FOR OSCILLOSCOPE

[72] Inventor: Kazu Suzuki, Tokyo, Japan

[73] Assignee: Hewlett-Packard Company, Palo Alto, Calif.

[22] Filed: Feb. 24, 1970

[21] Appl. No.: 13,391

[30] Foreign Application Priority Data

July 29, 1969 Japan..................................44/71400

[52] U.S. Cl...................................95/44, 353/76, 353/101, 355/70
[51] Int. Cl........................................................G03b 27/54
[58] Field of Search....................95/44; 355/40, 70; 353/69, 353/76, 101

[56] References Cited

UNITED STATES PATENTS

| | | | |
|---|---|---|---|
| 3,264,935 | 8/1966 | Vose | 353/101 X |
| 3,342,102 | 9/1967 | Maxon | 353/69 |
| 3,466,125 | 9/1969 | Jordan | 353/69 X |
| 3,494,694 | 2/1970 | Morita | 353/76 |
| 2,141,392 | 12/1938 | Honrine | 355/70 |
| 2,596,376 | 5/1952 | De Goeij | 355/70 X |
| 2,239,379 | 4/1941 | Bucky | 95/44 |
| 2,481,082 | 9/1949 | Chew | 95/44 |

FOREIGN PATENTS OR APPLICATIONS 1,344,145  10/1963  France......................................95/11

Primary Examiner—John M. Horan
Assistant Examiner—Michael Harris
Attorney—A. C. Smith

[57] ABSTRACT

A pair of light beams are projected at an angle onto a display surface such as the display screen of a cathode-ray tube in order to provide regions of illumination of the display screen which move apart or together as the light beam source and photographic apparatus mounted to move with the light beam source is moved normal to the display surface. When the regions of illumination are just overlapping and the oscilloscope surface is evenly illuminated, the camera is in focus.

3 Claims, 6 Drawing Figures

3,638,549

FIG. 3
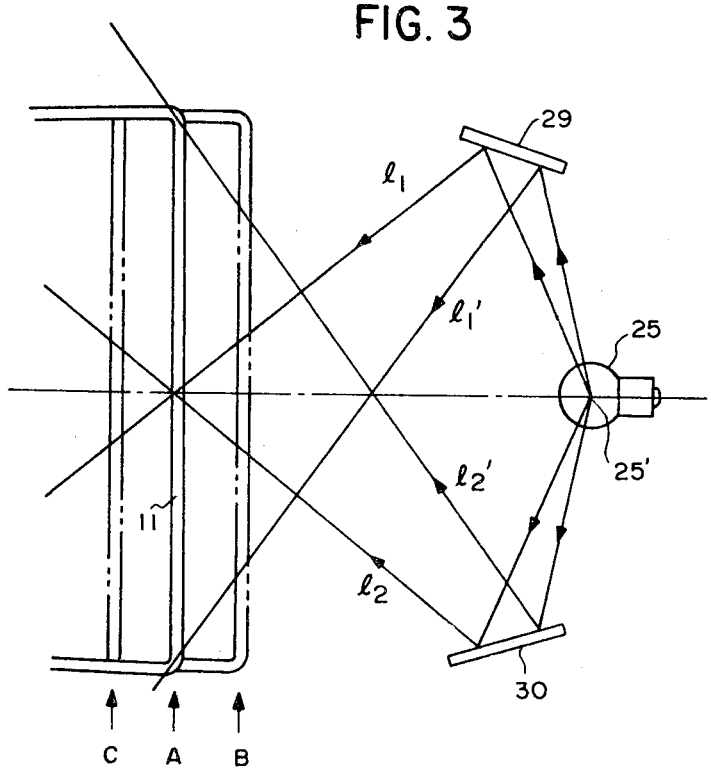
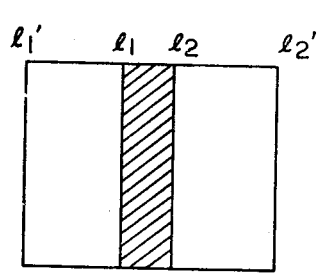
FIG. 4(C)
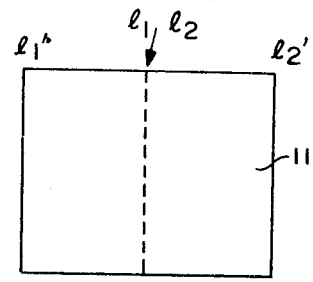
FIG. 4(A)
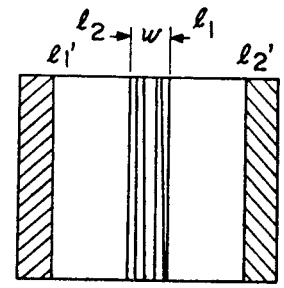
FIG. 4(B)

PHOTOGRAPHING SYSTEM FOR OSCILLOSCOPE

BACKGROUND OF THE INVENTION

Generally speaking, in photographing the waveform of the bright spots appearing on the fluorescent screen of a cathode-ray tube, it is difficult to obtain clear and sharp display images without the so-called focusing operation for determining the mutual relation among the cathode-ray tube surface, the lens, and the film. Moreover, the fluorescent screen of a cathode-ray tube is not necessarily mounted at a constant interval from the front panel of the oscilloscope, and besides, it may be concave or convex according to the system of the instrument. Consequently, in the conventional focusing operation, a lens image is focused on a focusing glass-plate placed in place of the film, for instance, and the lens was screwed back and forth while observing the focusing condition. In this manner of focusing, it was customary that long time was wasted in determining the degree of advancing said lens.

SUMMARY OF THE INVENTION

Present device includes photographic apparatus such as a lens system and a film-support package mounted on a slidable base plate which is also mounted to a source of light beams. These light beams are disposed to illuminate a display surface such as the display screen of a cathode-ray oscilloscope tube from opposite sides of the display surface and at an acute incident angle. Proper positioning of the base plate is indicated by correct positioning of the light beams on the display surface.

DESCRIPTION OF THE DRAWING

FIGS. 3 and 4 are the light reflection diagram and the bright-dark pattern diagram for describing the operation of the focusing adjustment.

DESCRIPTION OF THE PREFERRED EMBODIMENT

Figure 1:
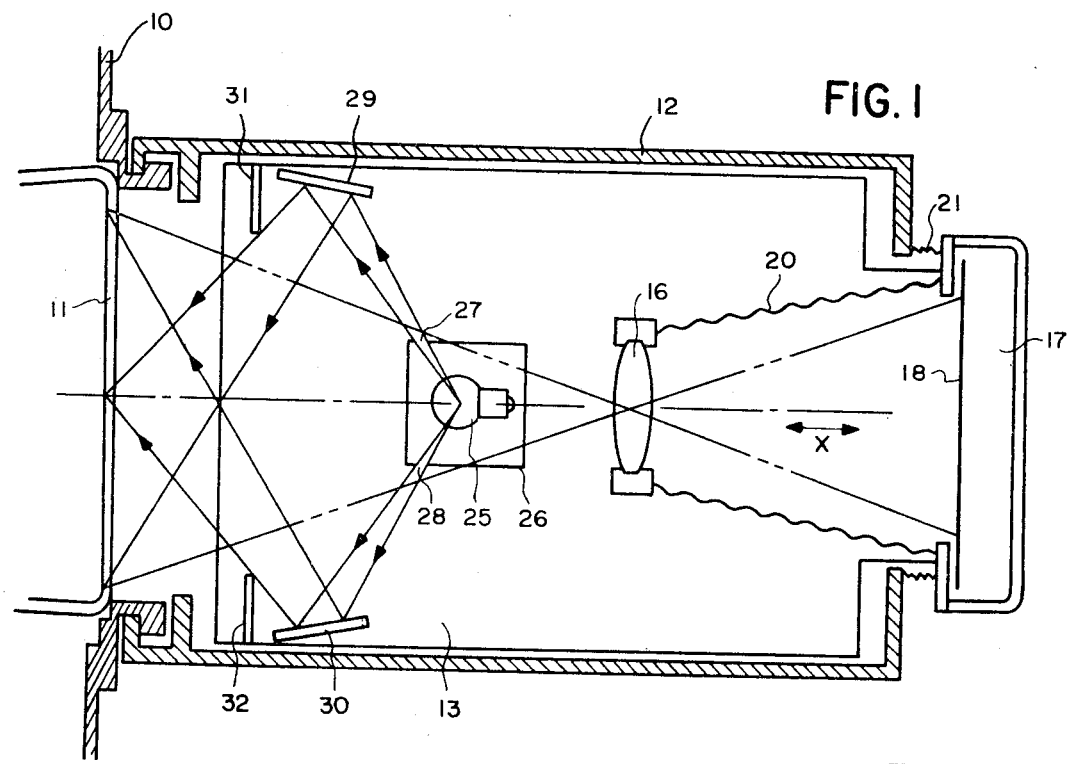
FIGS 1 and 2 are the horizontal and vertical cross section diagrams respectively of the system of the present invention.
Figure 2:
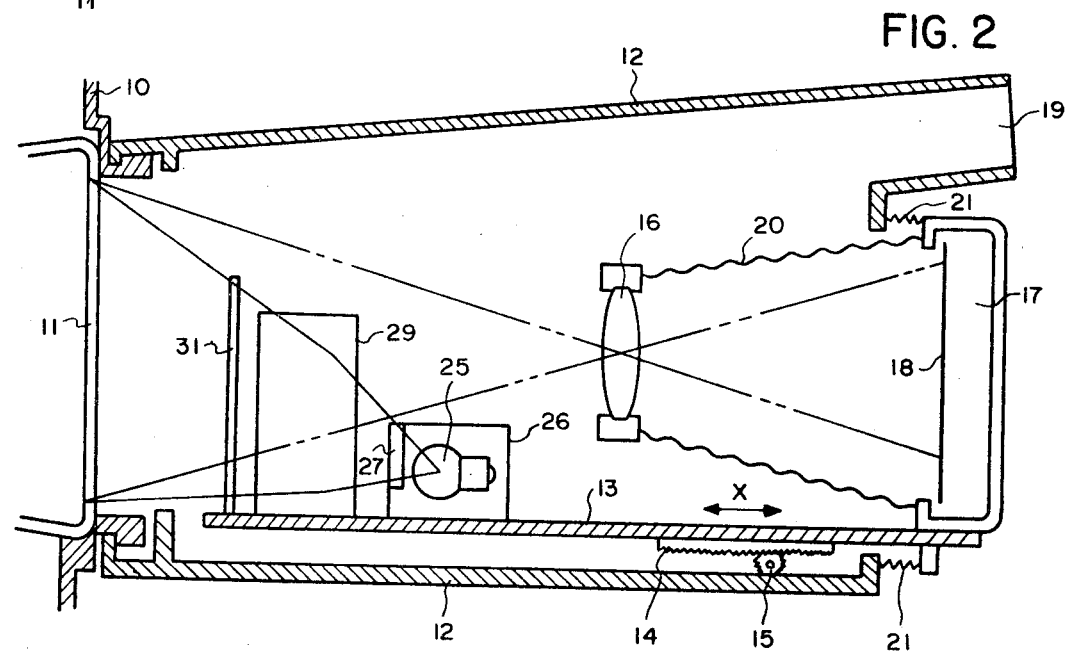

FIGS. 1 and 2 are the horizontal and vertical cross section diagrams respectively of the system of this invention. In these two diagrams, 10 indicates the front panel of oscilloscope, 11 is the fluorescent surface of the cathode-ray tube, and 12 is the camera box mounted on panel 10. The aperture of the camera box 12 is placed opposite to the surface 11 of the tube. Also, 13 is a movable base plate which may be moved within the box 12 in the direction of the central axis (indicated by arrow symbol X) of the cathode-ray tube surface by means of rack 14 and pinion 15. On the movable base plate 13 are placed lens 16 and camera pack 17 at spaced locations along a central axis. Also, 18 indicates a photosensitive film mounted inside the camera pack 17, and 19 is the observation window provided at the other end of box 12 above the camera pack 17, and 20 and 21 are light shielding barriers. Furthermore, 25 is a light source lamp for focus adjustment which is enclosed within the cover 26. The light from lamp 25 passes through apertures 27, 28 provided on both sides of the cover 26, reflected by reflecting mirrors 29, 30 mounted on both sides of the base plate 12, and then projects onto the surface 11 of the cathode-ray tube. Here, it is assumed that the cover 26 is so disposed that it does not stand in the field of view of lens 16, and at the same time, that the respective reflecting mirrors 29, 30 and the light-shielding plates 31, 32 are so disposed that each light beam passing through apertures 27, 28 project on one-half respectively of the cathode-ray tube surface 11.

With reference to the system of this invention of the above-mentioned construction, the light from lamp 25 reaching the tube surface 11 provides the bright-dark patterns on the tube surface, as shown in FIGS. 3 and 4. First, in reference to FIG. 3, if the cathode-ray tube surface 11 is disposed at position A in relation to the light point 25' of lamp 25, the luminous flux $l_1-l_1'$ reflected by the reflecting mirror 29 illuminates the left-hand half of the tube surface 11 as indicated in FIG. 4(A), and, on the other hand, the luminous flux $l_2-l_2'$ reflected by the reflecting mirror 30 illuminates the right-hand half of the tube surface 11, so that the entire surface of tube 11 shall present an even luminosity. Next, in case the tube surface 11 is disposed at position B which is closer to the light point 25' (actually the tube surface 11 is fixed and the light point 25' is moved), the central part of the tube surface 11 shall be considerably brighter than both sides of said tube surface as that part is illuminated by the reflected lights from both sides, as indicated in FIG. 4(B). Thus, the width W of this central bright part will spread as the tube surface 11 comes closer to the light point 25'. On the other hand, if the tube surface 11 is disposed at position C, the central part of tube surface 11 will be darker than both sides as it is not illuminated by either of the reflected luminous flux fields, as indicated in FIG. 4(C). Thus the more distant the tube surface 11 is from the light point 25', the greater will be the width of the dark central region.

Accordingly, the normal position of the lens 16 in relation to the cathode-ray tube surface 11 shall be advanced to where, as indicated in FIG. 4(A), exactly each half of the tube surface 11 shall be illuminated respectively by the reflected light from the opposite side, so that the entire surface shall be illuminated at an equal brightness. In order that the waveform developed by the bright spot image on the cathode-ray tube surface 11 may be focused under the best possible condition on film 18 by the lens 16, the proper distances between the tube surface 11, lens 16, and film 18 are accurately preset. Thus, notwithstanding the possibility that the tube surface 11 may be mounted either slightly forward or backward in relation to the front panel 10 of the oscilloscope, or that the mounting of the panel 10 and the camera box 12 may be slightly different, the base plate 13 on which are mounted said lamp 25 and lens 16 may be moved along the X direction of the arrow while observing the condition of illumination of the tube surface 11 through observation window 19. Thus, the focusing adjustment of this device is completed when the brightness of the tube surface 11 becomes even (or when the width W of the central stripe of the tube surface 11 becomes nil) as indicated in FIG. 4(A). Consequently, the focus adjusting is extremely easy.

In the above-described embodiment, the correct position of the lens for proper focus adjustment is designated as the location of the plat 13 which the tube surface becomes evenly illuminated. It should be understood, however, that the purpose may also be attained easily by a partial illumination of the tube surface just as well. For example, by using a filamented or pinholed mask in place of the apertures 27, 28 or light-shielding plates 21, 32, and by selecting the coinciding point on both sides of tube surface 11 of those lights that come through said mask, the correct lens position may be identified by an overlapping light spot. Also, a light image from one particular side may be used so that a coinciding point of said single light image and a mark previously applied on the tube surface may be sought.

In addition to the above mentioned, advantages of full illumination of the tube surface of this system may be counted additionally as follows. Generally, scale marks indicating the axes of coordinates are engraved or printed on the surface of the cathode-ray tube of an oscilloscope, and in photographing the bright point image of the phenomenon waveforms, it becomes frequently necessary to photograph said scale marks at the same time. And, as a means of illuminating said scale marks, it was a usual practice to illuminate the tube surface from an external light source or to illuminate from within by providing an electron beam source independent from the one for forming a bright point image within the tube. However, the disadvantages encountered with these devices are that the device is more complicated and inconvenient to use and frequently the lamp light intrudes partly into the field of view of the lens. Such defects are completely solved in accordance with the system of this invention, as it performs the scale mark illumination simultaneously as it provides indication of the focus adjustment and, moreover, the illumination irregularities are minimized as a single light source lamp illuminates the tube surface.

I claim:
1. Apparatus for photographing a signal display on the display surface of an oscilloscope, or the like, the apparatus comprising:
a base plate and mounting means therefor for slidably supporting the base plate for movement along an axis substantially normal to the display surface to be photographed;
lens means and film-holding means mounted in spaced relationship on said base plate with the film-holding means remote from the display surface to be photographed for including the display surface within the field of view of the lens means and film-holding means; and
light source means disposed on said base plate to illuminate the display surface at an angle with respect to said axis with a light beam having a cross-sectional area smaller than the display surface for illuminating only partial areas of the display surface which are representative of locations of the base plate along said axis for providing an indication by illumination of a preselected area of the display surface that the base plate is properly located with respect to the display surface for proper focus through the lens means.

2. Apparatus as in claim 1 wherein said light source means produces a pair of light beams which illuminate the display surface from opposite sides thereof at angles which are nonperpendicular to the display surface.

3. Apparatus as in claim 2 wherein said pair of light beams emanating from a side of the display surface each illuminates a portion of the display surface on the side thereof opposite the side from which the illuminating light beam emanates for producing on the display surface a region of overlapping illumination in response to spacing of the base plate and the lens means, film-holding means and light source means disposed on the base plate at a distance from the display surface less than the proper local length of the lens means and film holding means.

* * * * *